(12) United States Patent
Hoffman

(10) Patent No.: US 6,622,017 B1
(45) Date of Patent: Sep. 16, 2003

(54) OVER-THE-AIR PROGRAMMING OF WIRELESS TERMINAL FEATURES

(75) Inventor: Ted L. Hoffman, Camp Hill, PA (US)

(73) Assignee: Cellco Parntership, Bedminster, NJ (US)

( * ) Notice: Subject to any disclaimer, the term of this patent is extended or adjusted under 35 U.S.C. 154(b) by 0 days.

(21) Appl. No.: 09/556,444

(22) Filed: Apr. 24, 2000

Related U.S. Application Data (60) Provisional application No. 60/185,131, filed on Feb. 25, 2000.

(51) Int. Cl.[7] .................................................. H04M 3/00
(52) U.S. Cl. ........................ 455/419; 455/418; 455/412
(58) Field of Search ................................. 455/412–420, 455/551, 70, 517, 186.1, 352; 709/219, 328, 329

(56) References Cited

U.S. PATENT DOCUMENTS

| | | | |
|---|---|---|---|
| 5,586,338 A | | 12/1996 | Lynch et al. ................. 455/433 |
| 5,594,782 A | | 1/1997 | Zicker et al. ................ 455/417 |
| 5,603,084 A | * | 2/1997 | Henry, Jr. et al. .......... 455/419 |
| 5,613,204 A | | 3/1997 | Haberman et al. .......... 455/432 |
| 5,761,618 A | | 6/1998 | Lynch et al. ................. 455/419 |
| 5,790,952 A | | 8/1998 | Seazholtz et al. ........... 455/432 |
| 5,842,124 A | | 11/1998 | Kenagy et al. .............. 455/418 |
| 5,862,475 A | | 1/1999 | Zicker et al. ................ 455/419 |
| 5,920,821 A | | 7/1999 | Seazholtz et al. ........... 455/466 |
| 5,950,130 A | | 9/1999 | Coursey ...................... 455/432 |
| 6,023,620 A | * | 2/2000 | Hansson ...................... 455/419 |
| 6,029,064 A | | 2/2000 | Farris et al. ................. 455/412 |
| 6,029,065 A | | 2/2000 | Shah ........................... 455/414 |
| 6,052,600 A | * | 4/2000 | Fette et al. .................. 455/419 |
| 6,138,009 A | * | 10/2000 | Birgerson ................... 455/419 |
| 6,144,849 A | * | 11/2000 | Nodoushani et al. ....... 455/419 |
| 6,275,694 B1 | * | 8/2001 | Yoshida et al. ............. 455/419 |

FOREIGN PATENT DOCUMENTS

| | | |
|---|---|---|
| WO | WO 97/42782 | 11/1997 |
| WO | WO 98/58506 | 12/1998 |

* cited by examiner

*Primary Examiner*—Dwayne Bost
*Assistant Examiner*—Eliseo Ramos-Feliciano
(74) *Attorney, Agent, or Firm*—McDermott, Will & Emery (57) ABSTRACT

Terminal devices for a wireless communication network are manufactured and distributed with predetermined communication capabilities and a minimal operation capability. Each unit includes a substantial memory for plug-in feature programming, which initially is empty. A terminal user selects a desired feature or set of features and contacts a service provider. The provider's equipment downloads software programming corresponding to the desired feature into the memory of the terminal device. The software takes the form of a plug-in module, written to the program interface specification of the core software of the terminal device. When loaded into memory and interfaced through the core software, the module allows the terminal device to implement the desired feature. Features can be sold in predefined packages or individually. Features can be added, upgraded or replaced at any time by downloading new feature modules into the memory.

8 Claims, 4 Drawing Sheets

*DISTRIBUTION / PROGRAMMING PROCEDURE*

OVER-THE-AIR PROGRAMMING OF WIRELESS TERMINAL FEATURES

RELATE APPLICATIONS

This application claims the benefit of U.S. Provisional Application No. 60/185,131, entitled "OVER-THE-AIR PROGRAMMING OF WIRELESS TERMINAL FEATURES" filed on Feb. 25, 2000, the disclosure of which is entirely incorporated herein by reference.

FIELD OF THE INVENTION

The concepts involved in the present invention relate to a new approach to the manufacture, sale and distribution of wireless communication terminals, such as digital cellular telephones, and the special functions and features for such devices.

BACKGROUND

Mobile communication is becoming increasingly popular, particularly for voice-grade telephone services, and more recently for data communication services. As a result, there is an increasing demand for development of communication terminals with ever more sophisticated features. Even a low-end model of a digital cellular telephone will include caller identification capability, a large speed-dial list, called and calling party phone number lists, etc.

At present, manufacturers build the wireless terminal devices with a complete set of hardware and read-only software to support a full set of desired features. Development of a new wireless telephone currently takes about 18 months, from initial feature specification to first street-sale. Costs of development of new models of cellular telephones, with ever more sophisticated features are high and continue to spiral upward.

At the same time, driven by a long decline in consumer electronics prices, the price that the market will bear for such telephones has remained steady or even declined, in spite of the high demand. As a result, the margin on each telephone or terminal unit made and sold by a manufacturer is extremely small, sometimes only a few dollars a unit. The resellers, typically cellular carriers or their agents, sell the terminal units at a loss, as a form of subsidy or discount, to encourage customers to subscribe to and use their cellular network services.

Some capability exists today to program service-related information into digital cellular telephones. However, this capability has been limited to data needed to provision a new unit or to provision an existing unit for a new service. During initial provisioning, for example, the carrier programs in the mobile identification number assigned to the unit, a home system identifier, and a preferred roaming list containing the identifiers of systems providing financially favorable roaming services. Until recently, such programming involved a local physical connection to the unit and required a technician. More and more, the carriers are deploying various systems to enable at least some of the requisite programming data to be downloaded to the units via the wireless network.

For example, commonly assigned U.S. Pat. No. 5,613,204 to Haberman et al. teaches downloading a list of system identifiers (SIDs) over-the-air into a mobile station. The downloaded list is used to control system selection during roaming. The downloaded information may include information about features available through the identified systems. U.S. Pat. No. 5,950,130 to Coursey teaches downloading a system access list for roaming control as part of an over-the-air service activation process.

Essentially, these downloading techniques turn on or off available features by setting bits to toggle features on/off or by loading necessary control data, such as the list of system identifiers used to control system selection by the handset during roaming. The carrier may download new or updated data, for example, a new version of the preferred roaming list, from time to time.

The existing programming and downloading techniques do enable the carrier to modify some operations of the handset, to turn services on or off and/or to update necessary data. However, the feature functionality desired must already be present in the unit as manufactured and sold to the user. If the user desires a new feature that an existing unit does not support, the user still must discard the old unit and purchase a new unit that can support the desired feature.

SUMMARY OF THE INVENTION

The inventive concepts alleviate the above noted problems in development and distribution of wireless terminal devices with new features. Essentially, the manufacturer will develop and sell a terminal device having predetermined communication capabilities and a minimal operation capability. However, the unit will include a substantial memory for plug-in feature programming. After sale to an end user, the end user selects a desired feature or set of features and contacts a service provider. The provider may be the carrier operating the network that the user subscribes to, the manufacturer of the terminal unit or an independent third party. The user obtains software programming from the service provider, which is then loaded into the memory of the terminal device.

The downloaded software is essentially a plug-in software module, written to the application program interface specification of the core software of the terminal device. When loaded into memory, the core software together with the plug-in module implements the desired feature(s). Features can be added, upgraded or replaced virtually at any time by downloading new feature modules into the memory to add to or over-write the software for features previously downloaded into the terminal.

The manufacturer or other parties can upgrade units simply by writing new software. The manufacturer can sell the units for a set price, which may be small. However, the later sales of the features and/or sales of feature upgrades provide an additional revenue stream.

From the end users' perspective, they can obtain exactly the set of features that they desire. Also, there can be competition for writing the best software, for at least some features. For example, if a third party offers a better voice-recognition dialer module than that available from the carrier or the manufacturer, the user may opt to buy that software from the third party.

The downloading of the software into the wireless terminal device may utilize a variety of available technologies. For example, a data port on the terminal may be temporarily connected to a computer or to a disk or card reader and the software plug-in modules transferred into memory through the port. Preferably, the software downloading utilizes an over-the-air transfer.

The minimal capability of the base-line terminal device enables the device to establish a wireless link through the carrier's network to a data system. For network-related features and/or initial provisioning, this data system would be a private system operated by the carrier. The data system would send at least one software module containing the executable program necessary to allow the particular type of terminal to implement one or more features selected by the individual user.

In a preferred embodiment, the base-line functionality of the terminal implements a wireless web browser. The initial data communication would provide web pages for display on the terminal and allow the user to select packages of features and/or individual features from those available from the carrier. Upon selection and agreement to payment, a server would transmit the module(s) for the selected features through the network and over-the-air to the user's wireless terminal device. The terminal would check the integrity of the received module and load the software into flash memory. Once loaded, the terminal would execute the software, as needed to allow the user access to the selected service features. The user could initiate similar procedures to obtain other feature modules later, from the carrier directly, from the manufacturer or from a third party.

Thus, certain aspects of invention relate to methods for distributing and programming one or more wireless communication terminals. The methodology entails obtaining one or more programmable wireless communication terminals. Each terminal has a predetermined minimal set of operational capabilities. Each terminal includes a program memory for storing one or more feature modules and a processor for executing one or more of the feature modules to control the operational capabilities of the terminal. A substantial portion of the program memory is initially blank. In the preferred embodiments, the methodology also involves establishing a database of plug-in program modules. A plug-in program module comprises program code executable by the processor to enable implementation of a predetermined one or more communication features by a terminal.

When a terminal is distributed to a subscriber of communication services offered by a wireless network, the subscriber selects one or more features from those available through the network. The methodology then involves retrieving an executable program module corresponding to the selected feature from the database. That module is downloaded into the program memory in the subscriber's wireless communication terminal, to enable that terminal to implement the selected feature.

Other aspects of the invention relate to a network providing features based on the inventive downloading of feature modules and to the system providing the database and module transmissions to the handsets.

A further aspect of the invention relates to a unique implementation of the wireless terminal device itself. The terminal includes a wireless transceiver for communication via a public wireless communication system and a programmable controller. The terminal provides a user interface, coupled to the programmable controller, to enable a user to activate a terminal feature. A memory coupled to the controller includes two sections. The first section of memory stores a kernel of software necessary to implement a base-line functionality of the terminal device. The functionality implemented by the software kernel supports the user interface and is sufficient to support downloading of software into the terminal device. Also, the kernel implements a software interface. The second section of memory is writeable. This section is for receiving and storing at least one downloaded feature module program, which is executable by the programmable controller through the software interface. Execution of the module program would serve to implement one or more terminal features upon activation via the user interface.

A further aspect of invention relates to the unique software. A software product, in accord with this aspect, includes at least one machine readable medium and programming code, carried by the medium. A computer readable medium, as used herein, may be any physical element or carrier wave, which can bear instructions or code for performing a sequence of steps in a machine readable form. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave medium is any type of signal that may carry digital information representative of the instructions or code for performing the sequence of steps. Such a carrier wave may be received via a wireline or fiber-optic network, via a modem, or as a radio-frequency or infrared signal, or any other type of signal which a computer or the like may receive and decode.

In the disclosed embodiments, various software products reside on disks or in memory of network server computers, are transported via one or more data networks, as well as through the switching center, trunks and base stations of the wireless carrier's network, and over the air link to the terminal devices. The software also resides in program memory, typically a flash memory, within the terminal devices.

In the case of the software invention, the programming code on any such medium comprises a plug-in terminal feature module for execution by a controller of a wireless communication terminal. The module is compatible with a predetermined program interface implemented by the wireless communication terminal, for example, through the core kernel of software included at time of manufacture. Execution of the module by the controller from a memory in the terminal causes the terminal to perform a sequence of steps for implementing a predetermined terminal feature through a mobile wireless communication network.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PRESENTLY PREFERRED EMBODIMENTS

Figure 1:
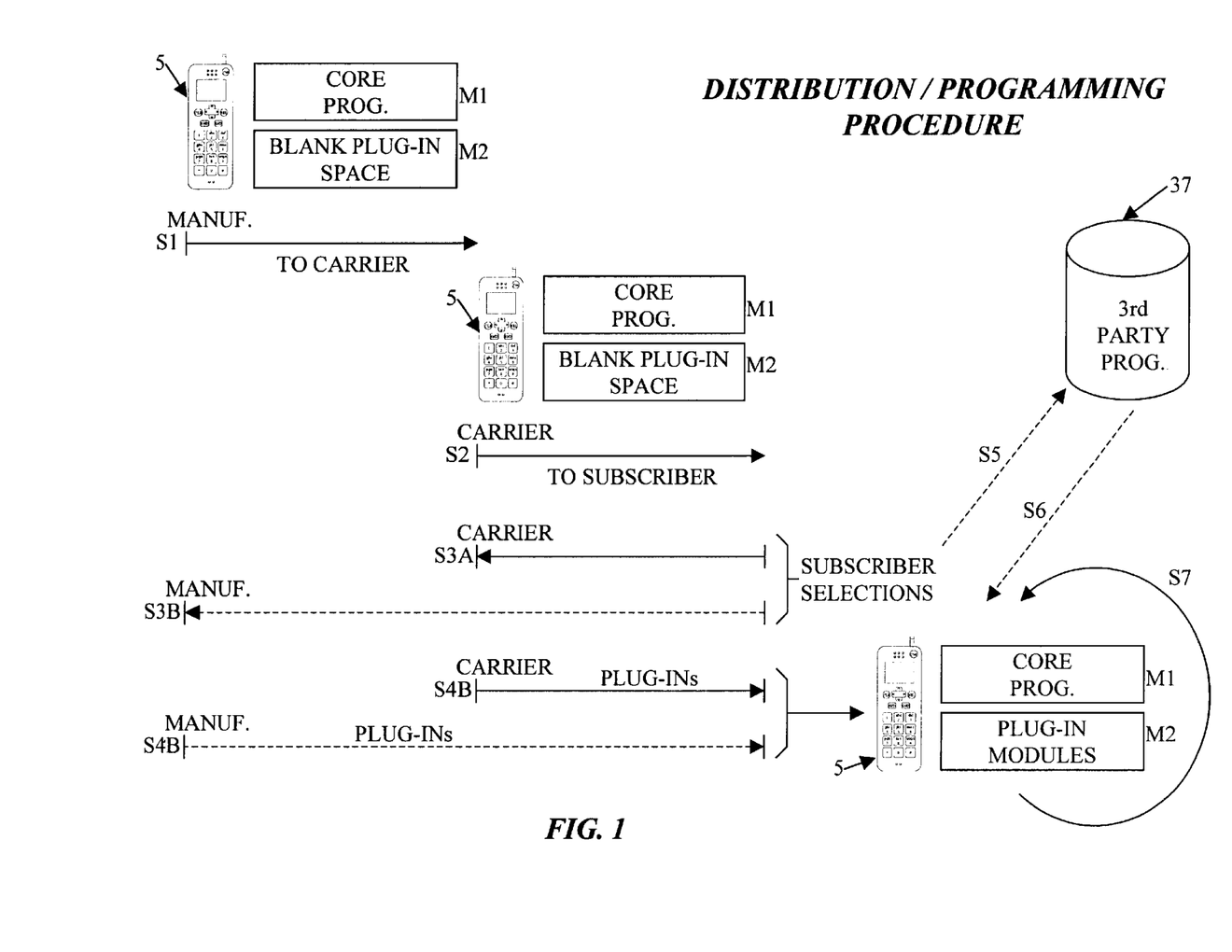
FIG. 1 is a process diagram useful in explaining the distribution of wireless terminals and associated feature programming, in accord with the present invention.

The present invention involves a new business model for development and distribution of new features for cellular telephones and other types of wireless communication terminals. FIG. 1 shows an example of the process flow, for distribution of the terminal devices and feature software in accord with the invention. In the illustrated example, the wireless terminals are digital cellular telephones 5, although the inventive methodology may apply to other types of wireless terminal devices.

Initially, the manufacturer develops and produces digital cellular telephone stations 5. Each station includes all hardware necessary to implement standard cellular telecommunication functions as well as a wide range of features desired by users of such stations. Each station 5 includes program memory, which can be logically considered as two sections M1 and M2. The first section M1 contains core programming software, that is to say the minimum kernel of software necessary to implement the base-line functionality of the wireless station 5. As discussed more later, this software enables voice and data communication over the wireless air-link interface. These communications at the base-line level may point to specific destinations, for example to enable provisioning and initial feature selection. The programming in memory section M1 also implements at least a minimal user interface. Preferably, the software implements some form of graphical user interface (GUI) designed for wireless terminals, such as a wireless web browser conforming to the wireless application protocol (WAP).

The second section of memory M2 is designed for storage of plug-in feature programs or modules. However, when initially manufactured, the memory section M2 is blank. The manufacturer sells the stations 5, with the blank memory section M2 to the carrier (at S1), and the carrier sells or otherwise distributes the terminals to its subscribers (at S2). When a subscriber first receives the cellular telephone 5, the section M2 of the memory for the plug-in feature modules is still blank. The core programming in memory section M1, however, enables the subscriber to make at least some communications using the station 5.

Typically, the subscriber with the new station has an opportunity to review information about features available for implementation through the new station or terminal device. The carrier or other provider may use any convenient means to distribute this information, such as conventional advertising media, print or electronic information products distributed in the packaging with the new station, or even verbal description from an operator during a telephone conversation. In a preferred embodiment, the subscriber receives the information via the terminal 5, for example as one or more web page displays.

In a preferred embodiment, the subscriber with the new cellular station 5 would use the station to contact the carrier and or certain data systems operated by the carrier to obtain feature software. This is analogous to an initial communication utilized to provision the station 5 on the carrier's network and typically would coincide with the provisioning process. In step S3A the subscriber communicates feature selections to the carrier. At some point, the subscriber may communicate certain feature selections to the manufacturer (S3B). Data systems of the carrier and/or the manufacturer will transmit one or more plug-in software modules to the station 5. The subscriber could receive a hard media of some type, such as a disk or card, and use some direct coupling to transfer the plug-ins to the station. In the illustrated example, however, the data systems of the carrier and/or the manufacturer transmit the plug-in(s) through the cellular network and thus over the air-link to the station 5 (step S4A and/or step S4B).

The programming initially resident in the station 5 will enable the station hardware to check the received feature programming modules to insure that each plug-in was completely received and/or to correct any errors in data transmission. When the station has verified that a plug-in was correctly and completely received, it loads the module into a part of the second memory section M2. Hence, after completion of the download procedure (S4A and/or S4B), the section M2 will contain one or more feature plug-in modules as shown. The carrier also has provisioned the station on the network by this time, therefore the subscriber can utilize the station in the normal manner. Of particular note, the station 5 can now perform all operations or steps in the sequence necessary to implement the particular features selected by the subscriber. Typically, the user views the terminal features now available in the terminal on a display and selects one of those features through the keypad or other user interface, each time the user desires to activate a particular features of the handset.

The carrier often will obtain the software plug-in modules for various features from the manufacturer(s) of the stations 5. However, the carrier may write its own programming or obtain some plug-ins from other sources. Many of the modules will be specific to one make and/or model of station available for service through the carrier's network. For a given feature or package of features, there may be as many different versions of the program module as there are different versions (make and/or model) of stations. However, if written to a standard program interface, some modules may run equally well in two or more types of station.

The inventive concepts also encompass downloading feature software for the station 5 from third party sources. For example, the manufacturer may offer a voice processing plug-in module for voice activated automatic dialing from the station 5. A third party, however, may offer a competing plug-in product. The competing product may be better or cheaper or more desirable for some other reason. Alternatively, the third party may offer a feature for the station that neither the carrier nor the manufacturer offers. In any such case, the subscriber can initiate a communication to a data system or server 37 operated by the third party programmer and indicate a desire to select a feature from that provider (S5). The server 37 transmits the plug-in for the selected feature to the station 5 (step S6), preferably through the cellular network and thus over the air-link. After reception and error checking, the plug-in is loaded, and the subscriber can utilize the new feature in the same manner as for the feature software downloaded from the carrier or the manufacturer.

As shown by the loop at S7, the various process steps of selecting features and downloading plug-in modules may be repeated any number of times. The subscriber may elect to repeat the process with any of the three providers, for example to obtain software upgrades for selected features, to select and obtain software for new features, etc. The download technique also is useful for debugging purposes. If a user has a problem with a feature, the user can initiate communications with a server of the particular software provider, and if necessary obtain a download of a new copy of the relevant module or obtain a download of a software patch for the existing module.

The storage of plug-in feature modules in the stations 5 is relatively permanent. Once successfully loaded into the section M2 of the memory, a module may remain there unchanged for the useful life of the terminal device 5. Most often, the methodology entails replacing a module previously stored in the terminal memory only when the subscriber desires to purchase a new module, either as a feature upgrade or to replace an old feature with a new feature. Consequently, the feature downloads tend to occur when the subscriber first purchases a new terminal device and infrequently thereafter.

Aspects of the invention relate to the methodology for distributing the terminal stations and software, to the stations themselves, to the software, as well as to the networks and systems involved. To insure a complete understanding of these various inventive concepts, it may be helpful to discuss examples of these various elements in somewhat more detail. Consider first a network implementing the feature programming in accord with the invention and providing a variety of services using stations programmed in accord with the invention.

Figure 2:
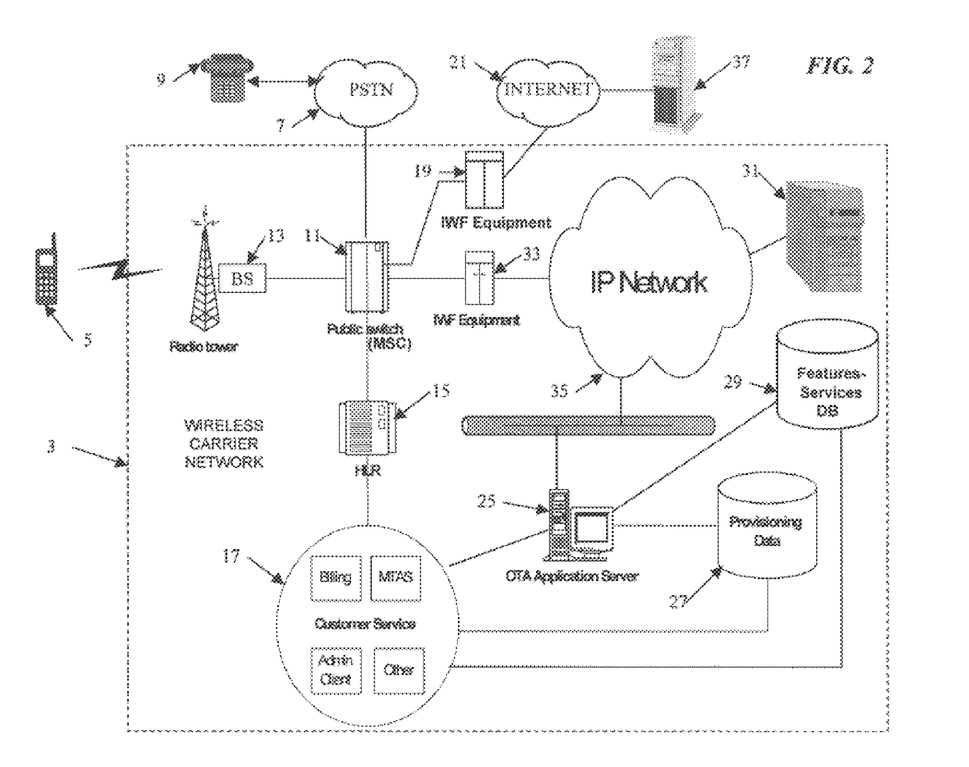
FIG. 2 is a simplified block diagram of a public wireless telephone network useful in explaining operations in accord with the invention.

FIG. 2 depicts a system for providing voice telephone communications as well as data communication services. Although the invention may apply to other types of wireless networks, as shown, a wireless telephone network 3 provides cellular or personal communications service (PCS) type services to mobile stations depicted by way of example as mobile handsets 5. The network 3 enables users of the mobile stations 5 to initiate and receive telephone calls to each other as well as through the public switched telephone network (PSTN) 7 to landline telephones 9.

The network 3 includes a number of mobile switching centers (MSCs) 11, one of which appears in the drawing for simplicity of illustration. Each MSC 11 connects through trunk circuits to a number of base stations (BSs) 13, which the MSC controls. Through the MSC 11 and the base stations 13, the network 3 provides voice-grade digital telephone services over the common air interface to and from the mobile stations 5. The network elements also may provide data services over the logical communication channels, as discussed more later.

The mobile stations 5, the MSCs 11 and the base stations 13 implement one or more standard air-link interfaces. For example, the wireless telephone network 3 may support dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol. Digital wireless equipment is available today to support any one of several common interface standards, including time division multiple access (TDMA) and the Global System for Mobile communications (GSM). In the preferred embodiment, the digital wireless telephone components support the code division multiple access (CDMA) standards, for example the CDMA protocol IS-95. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs may implement only one type of service.

As noted, the preferred digital equipment provides CDMA service. With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

As will be familiar to those of ordinary skill, an air-link interface for each cellular service in a geographic area includes paging channels and/or signaling channels, as well as actual communications channels for voice and/or data services. The channels may be separate frequency channels, or the channels may be logically separated, for example based on time division or code division. The paging and signaling channels are used for preliminary coded communications between a cellular telephone and a cell site in setting up a telephone call or other session, after which a communication channel is assigned or set up for the telephone's use on that call.

The wireless network 3 includes a home location register (HLR) 15 that stores subscriber profiles for each of the wireless subscribers and their associated digital wireless telephones 5. The HLR 15 may reside in the home MSC 11 or in a centralized service control point that communicates with the MSC(s) via an out-of-band signaling system such as an SS7 network. As recognized in the art, the HLR 15 stores for each mobile subscriber the subscriber's mobile telephone number, the mobile identification number, and information specifying the wireless services subscribed to by the mobile subscriber, such as numeric paging or text-based paging, data communication services, etc.

The carrier also operates a number of different systems in one or more customer service centers 17. These systems include one or more billing systems, network provisioning systems such as the Mobile Telephone Administration System or "MTAS", client account administration systems, and the like. The billing system, for example, receives usage and operations data from the MSCs 11 and processes that data to generate bills for individual subscriber and to forward data regarding users roaming through the carrier's service area through a clearinghouse (not shown) for reconciliation. The MTAS provides data to the HLR 15 and/or to the MSCs 11 to provision services for new stations 15 and modifies provisioning data as customers change their subscriptions to obtain different sets of services from the carrier.

In the more advanced implementations of cellular networks, such as the network 3, the carrier provides data communication services in addition to voice-grade telephone services. For example, the network 3 may include interworking function (IWF) equipment 19. This equipment provides a multi-call interface to communication links from the MSC 11 and typically implements a firewall finction. In this manner, the IWF equipment essentially looks like a dial-up interface to a data network such the public packet-switched network now commonly known as the Internet 21.

The user essentially makes a data call from the handset 5 to the IWF equipment 19. The equipment 19 answers the call and executes a handshake and log-in routine to validate the handset 5 and in some cases to validate the individual user. The IWF equipment 19 temporarily assigns an Internet Protocol (IP) address to the handset for the duration of the data communication. The equipment then provides a two-way data interface, with appropriate protocol conversions, enabling data access to the Internet 21. If desired, the IWF equipment may also initiate dial-out type procedures to push data communications from the Internet 21 through the network 3 to the particular handset 5.

The Internet access service enables users to access any equipment coupled to the Internet 21, virtually anywhere in the world. As discussed more later, one consequence is that a user of the station 5 can access a server 37 of an independent supplier of feature programming for the handset 5, such as the manufacturer or a third party.

As part of the provisioning of a new digital cellular telephone station 5, it is necessary to download certain data into the new station 5. To automate this procedure, the carrier operates an over-the-air (OTA) provisioning server 25. A provisioning database 27 stores data sets necessary to provision stations for the various services offered through the network 3 as well as a data table of all stations 5 served through the network 3 and the services currently provided to each station. When the new station first comes on-line, the customer service center 17 will establish a record for that station 5 in the provisioning database 27.

The provisioning database 27 is accessible by the OTA application server 25. The database 27 may be a program run on the sever computer or it may reside in a separate computer in communication with the server 25.

In a similar manner, the OTA application server 25 has access to a feature services database 29, running on the computer 25 or in a separate computer. The feature services database 29 stores the plug-in modules for all features available to the stations 5 through the carrier network 3, in versions written for each manufacture's type of wireless station 5. For the feature selection process, the carrier may also provide a web server 31 to supply web pages and receive selection inputs, to allow the users to select feature sets or ala carte feature offerings on-line.

Interworking function (IWF) equipment 33 provides a data interface similar to that provided by the equipment 19. The IWF equipment 33, however, provides an interface to a private data network operated by the carrier, shown as an IP network 35. The IWF equipment 33 and the IP network 35 provide data communications to the OTA application server 25 and the web page server 31.

The hardware of a server system, such as the server 25 or the server 31, corresponds to that of a typical general-purpose computer, comprising a central processing unit (CPU) formed of one or more microprocessors, a number of memory devices and an interface to the data communication network, in this case to the IP network 35. Such a computer may also provide a graphical user interface (GUI) for local operation and control, for example comprising a common type of display, a keyboard and one or more of the common types of cursor controls. Various media, readable by such a system, may store or carry the executable code and any associated data, for the web pages provided by the server 31 or for the provisioning data and feature module downloading performed by the OTA application server 25. Examples of such media include semiconductor and disk type memories, digital tapes, and the like. Computer readable media used by such systems also include various types of signals sent and received by computer systems for loading software code and associated data into the memory and/or the CPU of the system hardware and sending and receiving web pages and/or plug-in modules via the IP network 35, the MSC 11, the base station 13 and the air-link.

When the user first obtains a new station 5, the user operates the cellular telephone to call the customer service center 17 to initiate provisioning. The MTAS system provides provisioning data to the network elements. The customer service systems 17 also set-up an entry for the station 5 in the database 27. Once the account is set up, the user initiates a data communication with the OTA application server 25, and the server downloads data such as the mobile identification number to provision service in the handset 5, itself. A more detailed description of the over-the-air provisioning operations appears in commonly assigned U.S. patent application Ser. No. 09/123,454, filed on Jul. 28, 1998, by Hsu et al., entitled DIGITAL WIRELESS TELEPHONE SYSTEM FOR DOWNLOADING SOFTWARE TO A DIGITAL TELEPHONE USING WIRELESS DATA LINK PROTOCOL.

As part of the data communication session with the OTA application server 25, the station 5 may also communicate with the web page feature selection server 31. Alternatively, the user may initiate a later, session with the servers 25 and 31. In any of these sessions, the user reviews lists and/or descriptions of features available via the network 3. Preferably, the user activates the web browser software of the station 5 to review feature pages from the server and input selections via the station 5. Through this procedure the user selects the set of features that the user desires for the new station 5.

The carrier will typically offer packages of features, often corresponding to packages of services offered to subscribers using the cellular network 3. The packages may correspond to different levels or grades of cellular telephones, as commonly sold today. A high-end package may include virtually every feature available for the particular manufacturer's handset 5. A mid-range package of features would include the most desirable features and would support the most common services on the network. A low-end package would provide only minimal features. The carrier also may offer any or all of the features on an ala-carte basis.

When the subscriber has selected a desired feature or package of features, the selection information is forwarded to the OTA application server 25. The server updates the customer's record in the feature database 29 to show the selection and notifies the customer service systems 17 of the purchase of the selected feature(s). The OTA application server 25 obtains one or more plug-in program modules from the feature program database 29. These modules contain the executable software code needed to enable the particular brand of digital station 5 to provide the selected feature or features. The OTA application server 25 then transmits the plug-in modules through the IP network 35 to the IWF equipment 33. The IWF equipment converts the packets containing the program code from the form used on the IP network 35 to a format compatible with transmission through the MSC 11 and the base station 131 and over the air-link to the wireless terminal device 5.

The station 5 receives the packets containing the executable software for the feature plug-in modules over the air-link. The station extracts the software from the packets and compiles the complete set of transmitted code. The station 5 verifies that each received plug-in module was correctly and completely received, and if so, the station 5 loads the module into an appropriate location in its memory.

Since the carrier has provisioned the station 5 to operate on the network 3, the subscriber can now utilize the station 5 in the normal manner and to take advantage of the selected one or more handset features.

The OTA application server 25 will recognize a successful completion of a module download operation, for example, upon receipt of a confirmation message from the user's handset 5. The server 25 may make an appropriate notation in the user's record in the feature services database 29 and will notify the billing application of the customer services systems 17, to enable reporting and billing if appropriate on the user's next account statement. In some cases, the carrier may charge for each feature module obtained by the user. In other cases, the carrier may elect not to charge the user for the software module but to cover the expense instead through the monthly charges for a related network service.

If a purchased feature requires network provisioning, for example, to cause the network 3 to send caller identification data with incoming calls to the handsets, the MTAS application may be instructed to update the customer's network provisioning data in the HLR 15 and/or the home MSC 11. The billing system would then include monthly subscription charges for caller ID services in subsequent bills to the user.

At a later time, the user may initiate a similar procedure to obtain plug-in feature modules to upgrade or replace earlier selections or to add new features to the handset 5. For this purpose, the user may contact the carrier's systems 25 and 31, as discussed above. Alternatively, the user may initiate a data session through the IWF equipment 19 and the Internet 21. In such a session, the user can select features and obtain feature modules from any appropriate source or server available on the Internet. These sources may include data systems of the manufacturer (not separately shown) or independent third party program sources, such as the server 37.

It may also be helpful to consider the structure and functionality of a wireless terminal station 5, constructed for operation in accord with the present invention.

Figure 3:
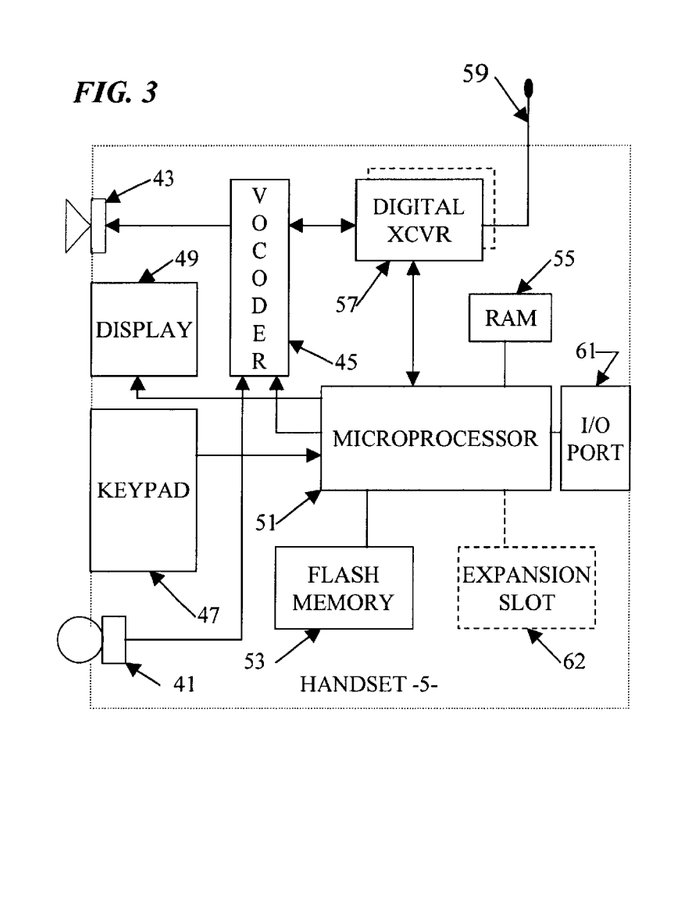
FIG. 3 is a functional block diagram of an exemplary wireless telephone station capable of implementing the inventive feature programming.
Figure 4:
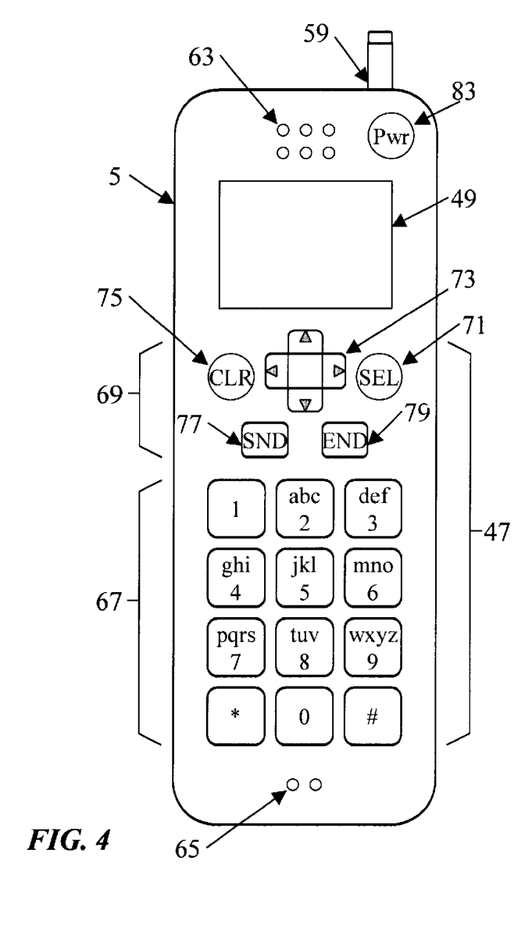
FIG. 4 is a front plan view of the exemplary wireless telephone station.

FIG. 3 is a functional block diagram, and FIG. 4 is in a plan view, illustrating a digital telephone station 5, which may be used in an implementation of one or more embodiments of the present invention. Although the station may be incorporated into a vehicle mounted mobile unit or into another device, such as a portable personal computer, for discussion purposes the illustrations show the station in the form of a handset.

The handset 5 functions as a normal digital wireless telephone station. For that function, the station 5 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 5 also includes a digital transceiver (XCVR) 57. The invention encompasses embodiments utilizing any type of digital transceivers that conforms to current or future developed digital wireless communication standards. For example, the transceiver 57 could be a TDMA or GSM unit, designed for cellular or PCS operation. In the preferred embodiments, the digital transceiver 57 is a CDMA transceiver. The transceiver 57 provides two-way wireless communication of information, such as vocoded speech samples and digital message information. The transceiver 57 connects through RF send and receive amplifiers (not separately shown) to an antenna 59.

The mobile telephone 5, upon initializing for operation in a CDMA system, acquires the pilot channel of the base station 13, obtains system configuration and timing information for the CDMA system, and begins monitoring the CDMA paging channels. In particular, the mobile station 5 may perform paging channel monitoring procedures while in an idle state. The mobile station 5 may operate in a slotted mode, where only selected slots (e.g., one or two slots per slot cycle) are monitored on the paging channel. Alternatively, the mobile station 5 may monitor all paging and control channels if operating in a non-slotted mode. In either case, the mobile station 5 monitors the paging and control channels for a command, and transmits an acknowledgement upon receiving any message that is addressed to the mobile station 5.

The digital wireless telephone network 3 may also be implemented as a TDMA (time-division multiple access) system. TDMA systems may be implemented using either the Pan-European digital mobile radio system GSM, DSC 1800, PCN (personal communication network), or the North American TDMA (NA-TDMA) digital cellular system known as IS-54. In the case of NA-TDMA, commands can be transmitted on a slot associated control channel (SACCH), which includes twelve code bits present in every time slot transmitted over the traffic channel whether these contain voice or the 260-bit fast associated control channel (FACCH) information.

The station 5 may be a dual or tri-mode telephone, in which case the station 5 would include one or more additional transceivers (represented by the dotted line associated with the transceiver 57) conforming to an alternate standard. Initially, the additional transceiver would likely consist of an analog transceiver conforming to the AMPS standard. However, it is within the scope of the invention to include an additional digital transceiver, as well. For purposes of further discussion, however, we will assume presence of a single digital transceiver 57, preferably in the form of a CDMA transceiver.

As shown, the digital telephone handset 5 also includes a display 49 for displaying messages, pages generated by a client browser program, call related information, dialed and calling party numbers, etc. A keypad 47 enables dialing digits for voice and/or data calls and generating selection inputs keyed by the user based on displayed information.

A microprocessor 51 controls all operations of the handset 5. The microprocessor 51 is a programmable device. The mobile unit 5 also includes a flash memory 53 for storing various software routines and mobile configuration settings, such as the mobile identification number (MIN), etc. The flash memory 53 has sufficient space to store the core programming of the handset 5 as well as a number of the plug-in feature modules. An example of the logical software contents of the flash memory is discussed later with regard to FIG. 5.

Flash memory is a form of non-volatile memory that stores data or executable code, which can be written over in a random access fashion but only under certain controlled circumstances. Typically, a special bit-pattern or code is required to write bits to specific locations in the flash memory. Different areas or sectors of the flash memory are accessible with different codes to provide different levels of write protection. The use of these different bit patterns to control the write operation to the sectors of the flash memory effectively limits who may access the various sectors.

For example, one area of the flash memory 53 stores the core programming of the handset 5, that is to say the operating system, the browser, etc, that provides the minimum functionality of the terminal. This area may be write-protected with a code known only to the manufacturer. The microprocessor 51 stores downloaded plug-in modules for the selected features in an area of the memory 53 that has one or more lower levels of protection. For example, the carrier may have the code to allow access to certain areas designated for storage of feature programming required by that carrier's network, whereas the microprocessor 51 of the handset itself may have the code to allow all other parties to write modules for less critical features into the remaining space in the memory 53.

Initially, program modules for newly selected features or feature packages are loaded to otherwise blank areas of the memory 53. However, over time, the memory 53 may become full. Further addition of new modules, to support new features or enable feature updates, then requires that new modules are written into memory 53 over older modules. In some cases, old modules may need to be deleted before new modules can be installed. The handset 5 may include an expansion slot 62, to allow the user to purchase and install additional memory to allow installation of an even larger number of feature modules.

The handset 5 ffurther includes a non-volatile random access memory (RAM) 55. The RAM 55 stores operating data, such as telephone numbers and other data input by the user via the keypad 37. The RAM 55 also may store received software, during reception and checking for errors and/or completeness, until the software is ready for loading into the sectors of the flash memory.

The handset 5 also includes one or more I/O ports 61 coupled to the microprocessor 51. The port 61 may enable a user to connect a laptop computer or other data device to the terminal 5, via wire or a short-distance wireless link, for example to enable wireless data communication for the laptop using the handset 5 over the network 3. For purposes of feature programming, this port 61 also allows input of modules of executable code for selected features. For example, the user may receive a floppy disk or CD with selected modules and load the modules from a computer through the port 61. As discussed more later, however, the preferred embodiment utilizes over-the-air programming to download the plug-in feature modules.

FIG. 4 shows the front of the cellular mobile station 5, in the form of a portable handset. As shown, the handset housing includes openings 63 enabling sound to emerge from the speaker 43, as well as openings 65 to allow input of sound to the microphone 41.

The handset 5 includes the visible display screen 49. The handset 5 also includes various keys making up the keypad 47. The keypad 47 typically includes at least two sets of keys 67, 69. The keys 67 represent dialing-input keys. Typically, each of the twelve keys is imprinted with a number from 1 to 0, an asterisk or star (*), and a number sign (#). Each of the keys 2 through 9 is imprinted with three or four letters, to enable input of alphabetical information.

The keys 69 are function keys. Exemplary function keys include a cursor control or scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3 shows three of the function keys for input of information to and retrieval of information from the processor and memory of the handset and/or selection of features from a displayed menu or web page. One of these keys is the cursor key 73. This key at least controls up and down movement of a displayed cursor or highlight function and attendant scrolling of menus or pages shown on the display 49. In the illustrated embodiment, the key 73 also provides a left or right input for side-to-side cursor control. The exemplary keys also include the selection (SEL) key 71, which enables a user to select an option indicated by the cursor or highlighting. The clear (CLR) key 75 enables the user to erase a selection. A wide variety of other cursor controls and selection inputs could be used.

The keypad 47 supplies user input information to the microprocessor 51, and the microprocessor provides digital data signals to cause the display 49 to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators.

Hence, under control of the microprocessor 51 and its programming, the keypad 47 and the display 49 provide a graphical user interface allowing the customer to input information and receive information. The preferred user interface includes a wireless application protocol (WAP) type web browser. In accord with the invention, part of this user interface relates to the feature selection and programming service.

To make a routine telephone call, a user dials in the destination number by actuating the appropriate ones of the number keys 67 and then pushes the send (SND) key 77. The microprocessor 51 generates a call request message in the appropriate protocol. This message includes the dialed destination number. The microprocessor causes the digital transceiver 57 to send the message, as a signaling message, for example over the signaling channel of the particular wireless air-interface to a base station, for call set-up processing by the network 3.

In a feature selection operation, the microprocessor 51 will cause the screen 49 to display a page of information about one or more available features. The user would actuate the key 73 to move the cursor to a link to another page or to select a feature listed on the displayed page. When indicated by the cursor, the user would actuate the select (SEL) button 71 to effectively 'click-on' the item and/or actuate the SND key 77, to initiate transmission. In response, the wireless terminal 5 would transmit a URL or other data corresponding to the selected item over the air-link and through the network 3, for example to the server 31. The transmission may utilize a channel previously allocated to a session between the handset 5 and the IWF equipment, or the key actuation may trigger set-up of a new link through the network 3 for the message transmission.

Of course, the user interface provided through the display 49 and the keypad 47 also allows the user to select and operate the various terminal features provided by the downloaded plug-in modules. For example, the user may select the speed dial list and then activate the key 73 to scroll through the list as shown on the display 49. Upon viewing a desired item in the list, the user may activate keys to edit the name or number shown under the listed item or push the send (SND) key 79 to activate the station 5 to call the listed party. The microphone and speaker may also serve as elements of the user interface, for example, if a feature or selection entails announcements and/or speech-recognition of inputs from the user. Such an interface strategy allows use of a speech recognition based speed dialing feature, to automatically initiate hands-free calls.

Figure 5:
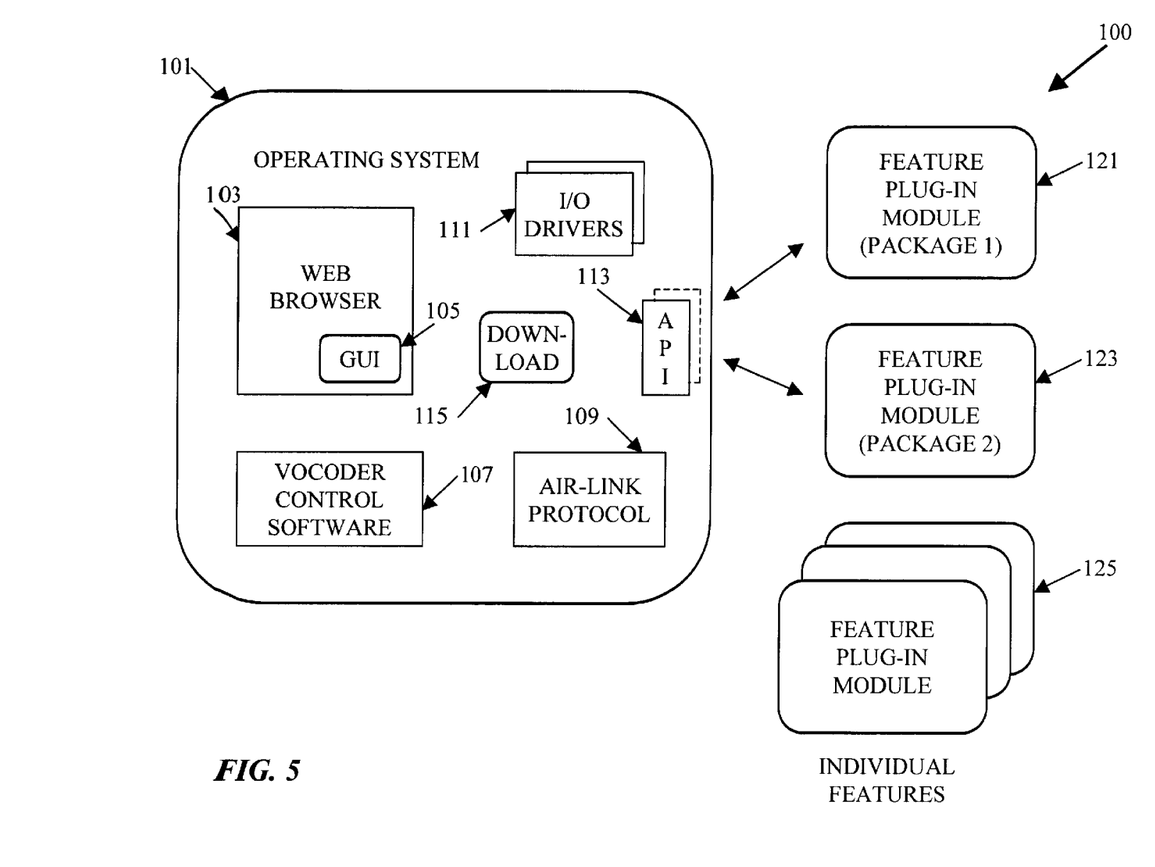
FIG. 5 is a logical block diagram, useful in explaining the organization of the software within a terminal device implementing the present invention.

FIG. 5 is a logical block diagram helpful in explaining the architecture of the software system 100 used in the wireless terminal device 5, in accord with the invention. In a typical implementation, the random access type flash memory 53 initially stores core programming and receives and stores one or more downloaded feature modules for implementing selected handset features.

The core programming or kernel includes an operating system 101 along with various drivers and application programs. On top of the operating system, the microprocessor 51 runs a number of software routines or applications from the memory 53. The first of these applications is a web browser program 103 designed for wireless terminals, sometimes called a thin client browser. The browser enables data communications over the network 3 and an IP network such as the network 35 or the Internet 21. The software implements a graphical user interface (GUI) 105, including a user interface for communications through the wireless network 3 and the packet data networks 21 and 35. For many services, this enables display of received pages and selection of links from the pages, for example to review available features and select desired features.

The stored programming in memory 53 also includes I/O device driver software 111 for the physical elements of the terminal 5 that provide the user interface, such as the display 49 and the keypad 47. The driver programming also includes a device driver for the I/O port 61. The stored programming also includes vocoder software 103 and call processing software conforming to the particular air-link protocol 109 of the network 3, for example conforming to the current CDMA standard.

For purposes of the feature programming, the core software may implement one or more application programming interfaces (APIs) 113, which provide a logical interface between the plug-in feature modules and the core programming. The core software stored in the flash memory 53 also includes an application 115 for implementing the download of the plug-in modules, error correction, checking for completion and loading thereof into the flash memory 53 for subsequent execution.

The software system 100 also includes a variety of the feature modules, several of which are shown as examples in FIG. 5. Feature modules typically are written to the specifications of the hardware and the API of the particular type of handset 5. The station 5 may receive, store and execute modules 121 or 123, that correspond to different sets or packages of features. Alternatively, the station 5 may receive, store and execute modules 125 for individual features. In many cases, the memory 53 of the station 5 will contain a plug-in module 121 or 123 for one package of features provided by the carrier, plus one or more individual feature modules 125 obtained from any of the available sources. The microprocessor 51 executes the feature module programming through the operating system 101 and the API 113.

Aspects of the invention relate to the software elements, such as those shown in FIG. 5. At different times all or portions of the executable code for any or all of these elements may reside in physical media or be carried by electromagnetic media. Physical media include the memory 53 of the stations 5, various semiconductor memories, tape drives, disc drives and the like of personal computers, workstations, host computers or network servers. All or portions of the software, particularly the plug-in modules may at times be communicated through various networks. Thus, another type of media that may bear the software includes optical, electrical and electromagnetic waves, such as used across physical interfaces between local devices, through landline networks and over various air-links.

While the foregoing has described what are considered to be best mode and/or other preferred embodiments of the invention it is understood that various modifications may be made therein and that the invention may be implemented in various forms and embodiments, and that it may be applied in numerous applications, only some of which have been described herein. It is intended by the following claims to claim any and all such modifications and variations which fall within the true scope of the invention.

What is claimed is:

1. A method, comprising:

obtaining programmable wireless communication terminals each having a predetermined minimal set of operational capabilities, a program memory for storing one or more feature modules and a processor for executing one or more of the feature modules to control the operational capabilities, wherein a substantial portion of the program memory is initially blank;

establishing a database comprising a plurality of separate plug-in program modules, each plug-in program module comprising program code executable by the processor to enable implementation of a predetermined one or more communication features;

distributing one of the programmable wireless communication terminals to a subscriber of a communication service offered by a wireless communication network;

receiving from the subscriber a selection of a feature from among a plurality of available features;

retrieving one of the executable program modules from the database, the retrieved module corresponding to the selected feature;

downloading the retrieved module into the substantial portion of the program memory in the one programmable wireless communication terminal, to enable the one wireless communication terminal to implement the selected feature; and automatically provisioning at least one element of the wireless communication network to activate a subscription service corresponding to the selected feature.

2. A method as claim 1, further comprising transmitting information relating to the available features over the air-link to the one programmable wireless communication terminal for presentation to the subscriber, to facilitate feature selection by the subscriber.

3. A method as in claim 1, further comprising:

receiving from the subscriber a selection of a second one of the available features retrieving second one of the executable program modules from the database, the second retrieved module corresponding to the second selected feature; and downloading the second retrieved module into the substantial portion of the program memory in the one programmable wireless communication terminal, to enable the one wireless communication terminal to implement the second selected feature.

4. A method as claim 3, further comprising automatically provisioning at least one element of the wireless communication network to activate a subscription service corresponding to the second selected feature.

5. A mobile wireless communication network for providing communication services for subscribers using wireless terminal devices, comprising:
- a plurality of base stations implementing wireless communications with the wireless terminal devices over a standard air interface;
- a mobile switching center coupled to the base stations;
- a controller for controlling services provided through the wireless communication network to the wireless terminal devices;
- an over-the-air software download server coupled for communication with the wireless terminal devices through the mobile switching center and one or more of the base stations;
- a database comprising a plurality of separate plug-in program modules coupled to selectively supply the modules to the download server, each of the plug-in program modules comprising program code executable by a processor of a wireless terminal device to enable implementation of a predetermined one or more terminal features; and
- a provisioning system in communication with the controller for supplying provisioning data to the controller for activation of services in the wireless communication network, wherein:
  - upon identification of a feature selected by one subscriber, the download server receives a program module corresponding to the selected feature from the database and transmits the received program module through the mobile switching center and one of the base stations and over the standard air interface to one wireless terminal device associated with the one subscriber for storage therein, to enable implementation of the selected feature by the associated wireless terminal device, and
  - upon transmission of the received program module to the one wireless terminal device, the download server causes the provisioning system to supply provisioning data to the controller for activation of a service associated with the selected feature in the wireless communication network with respect to the one wireless terminal device.

6. A mobile wireless communication network as in claim 5, wherein the standard air interface implemented through the base stations supports digital voice and data communication services.

7. A mobile wireless communication network as in claim 5, further comprising a server coupled for data communication through the mobile switching center, for transmitting information describing available features to the wireless terminal devices for presentation to subscribers, to facilitate feature selections.

8. A mobile wireless communication network as in claim 7, wherein the information comprises one or more web pages describing the available features.

* * * * *